(12) United States Patent
Balsdon et al.

(10) Patent No.: US 9,206,772 B2
(45) Date of Patent: Dec. 8, 2015

(54) ARTICULATING POPPET TO SEAL A NATURAL VACUUM LEAK DETECTION DEVICE

(75) Inventors: David William Balsdon, Chatham (CA); Kris Smith, Chatham (CA); Peter Hueniken, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 591 days.

(21) Appl. No.: 13/546,124

(22) Filed: Jul. 11, 2012

(65) Prior Publication Data
US 2013/0015378 A1 Jan. 17, 2013

Related U.S. Application Data

(60) Provisional application No. 61/506,519, filed on Jul. 11, 2011.

(51) Int. Cl.
*F02M 25/08* (2006.01)
*F16K 17/04* (2006.01)
*F16K 25/00* (2006.01)

(52) U.S. Cl.
CPC ........ *F02M 25/0836* (2013.01); *F16K 17/0413* (2013.01); *F16K 25/00* (2013.01); *Y10T 137/7779* (2015.04)

(58) Field of Classification Search
CPC F02M 25/0836; F16K 15/023; F16K 15/063; F16K 17/0413; F16K 25/00; Y10T 137/7771; Y10T 137/7779

USPC ............................ 251/86, 88; 137/493, 493.8
See application file for complete search history.

(56) References Cited

U.S. PATENT DOCUMENTS

| | | | | |
|---|---|---|---|---|
| 1,740,420 | A | * 12/1929 | Friedman | .......................... 137/71 |
| 1,939,128 | A | * 12/1933 | Meyer | ....................... 137/543.13 |
| 3,384,342 | A | * 5/1968 | Passer | ............................ 251/357 |
| 3,412,756 | A | 11/1968 | Shore | |
| 4,114,850 | A | * 9/1978 | Alamprese | ....................... 251/86 |
| 4,790,346 | A | * 12/1988 | Kolze et al. | .................... 137/331 |
| 6,470,861 | B1 | 10/2002 | Perry | |
| 2005/0189509 | A1 | 9/2005 | Peric | |
| 2009/0133672 | A1 | 5/2009 | Crisan | |

FOREIGN PATENT DOCUMENTS

WO 2012080177 A1 6/2012

OTHER PUBLICATIONS

Search and the Written Opinion of the International Searching Authority, PCT/US2012/046174, Dec. 13, 2012.

* cited by examiner

*Primary Examiner* — William McCalister (57) ABSTRACT

A Natural Vacuum Leak Detection (NVLD) device having an articulated poppet to allow the sealing surface of the poppet portion to articulate, or wobble, on the end of a poppet pin, where the poppet pin is mounted to the end of the flange portion. The flange portion has the friction spring, and poppet spring pushing on it. The seal surface of the flange portion is able to move to evenly apply force to the lip seal, and provide a full seal. Because the seal surface of the flange portion is able to articulate, or wobble, the flange portion is able to compensate for misalignment between the poppet stem portion and lip seal.

11 Claims, 6 Drawing Sheets

ARTICULATING POPPET TO SEAL A NATURAL VACUUM LEAK DETECTION DEVICE

CROSS-REFERENCE TO RELATED APPLICATIONS

This application claims priority to Provisional Patent Application No. 61/506,519, filed Jul. 11, 2011. The disclosure of the above application is incorporated herein by reference.

FIELD OF THE INVENTION

The present invention relates generally to an articulating poppet used with a Natural Vacuum Leak Detector (NLVD) device.

BACKGROUND OF THE INVENTION

A known fuel system for vehicles with internal combustion engines includes a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

An automotive leak detection on-board diagnostic (OBD) determines if there is a leak in the vapor management system of an automobile. The vapor management system can include the fuel tank headspace, the canister that collects volatile fuel vapors from the headspace, a purge valve and all associated hoses. A pressure/vacuum sensor or switch allows the engine computer to monitor the vacuum that is caused by the system cooling after the engine has been turned off and thereby performs the leak detection diagnostic. A vacuum relief function provides fail-safe operation of the purge flow system and guarantees that vacuum levels in the fuel tank do not endanger the integrity of the tank both with the engine on and off.

A pressure relief function is desired in order to "blow off" any excessive fuel vapor immediately after engine shutdown and to facilitate the desired vacuum generation. Another benefit of the pressure relief function is to allow air to exit the tank at high flow rates during tank refueling. This function is commonly known as Onboard Refueling Vapor Recovery (ORVR).

The pressure relief function is typically achieved through the use of a Natural Vacuum Leak Detector (NLVD), which includes a pressure relief valve having a poppet mounted on the end of a shaft, and a diaphragm. The NLVD functions to relieve excessive negative pressure (vacuum). The poppet and shaft move to change the valve between an open and closed position. The poppet and shaft contact a lip seal when the valve is in the closed position.

However, there are instances when the poppet may be misaligned relative to the lip seal, potentially causing a leak in the NLVD device. Accordingly, there exists a need for an improved NVLD device that compensates for misalignment between the poppet and the lip seal.

SUMMARY OF THE INVENTION

The present invention is an articulated valve for preventing leaks in a natural vacuum leak detection (NLVD) device. The articulated valve includes a poppet stem portion which has a flange portion, and the flange portion has a lower surface and a support surface. The flange portion and an enlarged diameter portion are integrally formed as part of the poppet stem portion, and a lower stem portion is integrally formed with the enlarged diameter portion. A plurality of ribs is integrally formed on the outer surface of the lower stem portion, and a poppet pin is integrally formed with and extending away from the flange portion. The articulated valve also includes a poppet portion. The poppet portion includes a poppet flange selectively in contact with and supported by the flange portion, and a hollowed extension integrally formed with the poppet flange. The flange portion includes a sealing surface, which contacts a seal when the articulated valve is in a closed position. The poppet pin is slidably received into the hollowed extension, allowing the poppet stem portion to articulate relative to the poppet portion.

It is an object of the present invention to provide an NVLD device having an articulated poppet design to allow the sealing surface of the poppet portion to articulate, or wobble, on the end of a poppet pin, where the poppet pin is mounted to the end of the flange portion. The movement of the flange portion is at least partially controlled by a friction spring, and a poppet spring. The seal surface of the flange portion is able to move to evenly apply force to the lip seal, and provide a full seal. Because the seal surface of the flange portion is able to articulate, or wobble, the flange portion is able to compensate for misalignment between the poppet stem portion and lip seal.

In an alternate embodiment, a spherical-shaped articulating poppet is used having a spherical-shaped poppet portion, which allows for the poppet portion to articulate relative to the poppet stem portion and achieve an adequate seal between the poppet flange and the lip seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring now to the Figures generally, a Natural Vacuum Leak Detection (NLVD) device having an articulated poppet according to the present invention is part of a fuel system shown generally at 10. The system 10 includes the NLVD device 12, a vacuum source 14, which in this embodiment is an intake of an engine, a purge valve 16, a charcoal canister 18, and a fuel tank 20.

The NLVD device 12 performs a plurality of functions including signaling 22 that a first predetermined pressure (vacuum) level exists in the headspace of the fuel system 10, relieving pressure 24 (also referred to as relieving excess vacuum) in the headspace of the fuel system 10 at a value below the first predetermined pressure level, and relieving pressure 26 (also referred to as pressure blow-off) in the headspace of the fuel system 10 above a second pressure level. Relieving pressure 24,26 refers to the relieving pressure in the fuel vapor collection canister 18 and throughout the headspace of the fuel system 10 relative to the ambient atmospheric pressure A.

In the course of cooling that is experienced by the fuel system 10, e.g., after the engine is turned off, a vacuum is created in the fuel vapor collection canister 18. The existence of a vacuum at the first predetermined pressure level indicates that the integrity of the fuel system 10 is satisfactory. Thus, signaling 22 is used for indicating the integrity of the fuel system 10, i.e., that there are no appreciable leaks. Subsequently relieving pressure 24 at a pressure level below the first predetermined pressure level protects the integrity of the fuel tank 20, i.e., prevents it from collapsing due to vacuum in the fuel system 10.

Immediately after the engine is turned off, relieving pressure 26 allows excess pressure due to fuel vaporization to blow off, thereby facilitating the desired vacuum generation that occurs during cooling. During pressure blow-off, air within the fuel system 10 is released while fuel molecules are retained in the fuel vapor collection canister 18. Similarly, in the course of refueling the fuel tank 20, relieving pressure 26 allows air to exit the fuel tank 20 at high flow.

While the engine is turned on, controllably connecting 28 the fuel vapor collection canister 18 to the ambient air A allows confirmation of the purge flow and allows confirmation of the signaling 22 performance. While the engine is turned off, controllably connecting 28 allows a computer for the engine to monitor the vacuum generated during cooling.

FIGS. 2-6 show an embodiment of the NVLD 12 constructed and arranged to be associated with the charcoal canister 18. The NVLD 12 includes a housing 30 that can be connected to the body of the charcoal canister 18. The NVLD 12 provides a configuration having an articulated poppet which improves the sealing function of the poppet, further described below.

Figure 1:
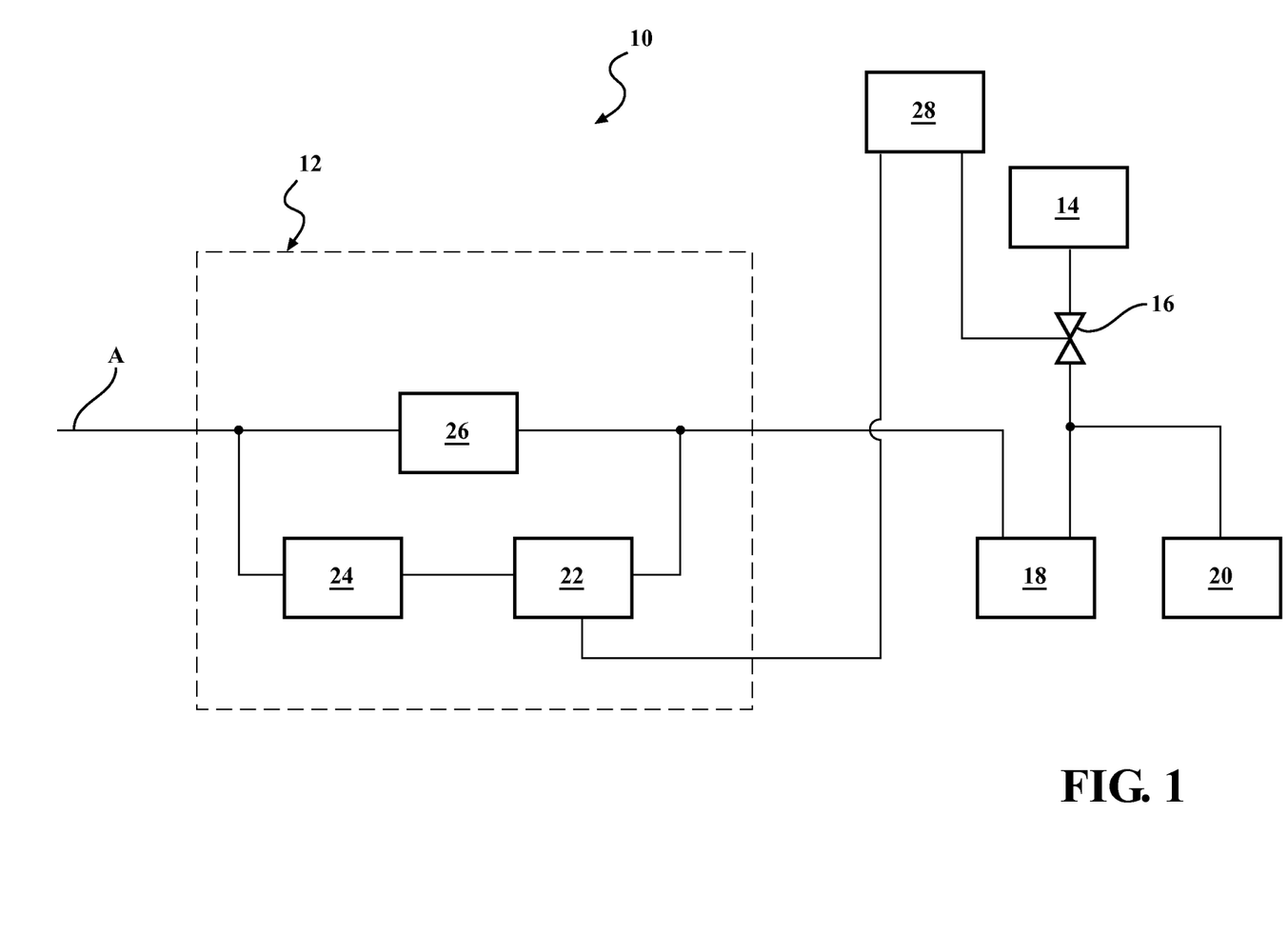
FIG. 1 is a schematic of a fuel system including an NVLD device having an articulating poppet, according to embodiments of the present invention.
Figure 2:
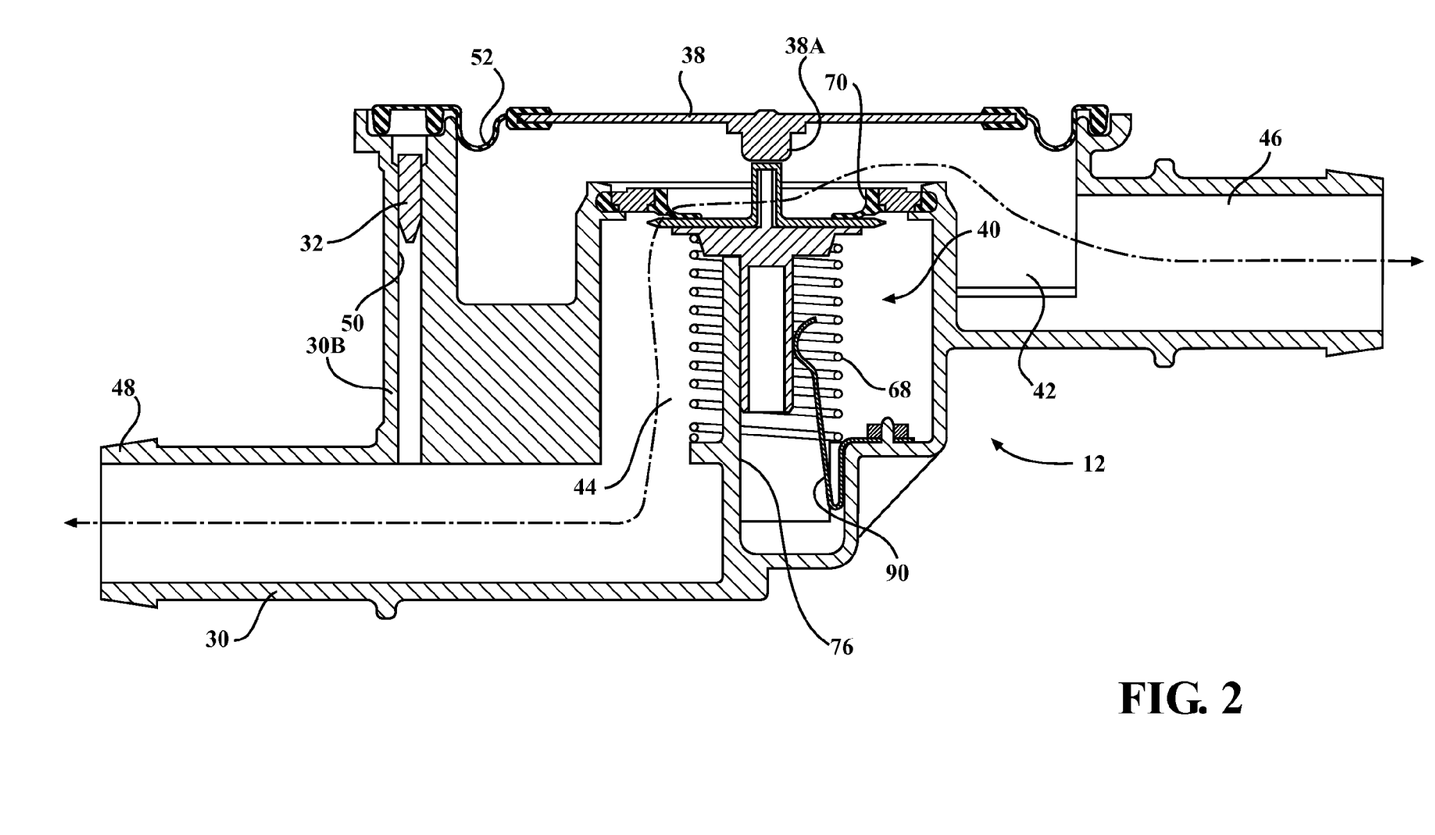
FIG. 2 is a first sectional side view of an NVLD device having an articulating poppet, according to embodiments of the present invention.
Figure 3:
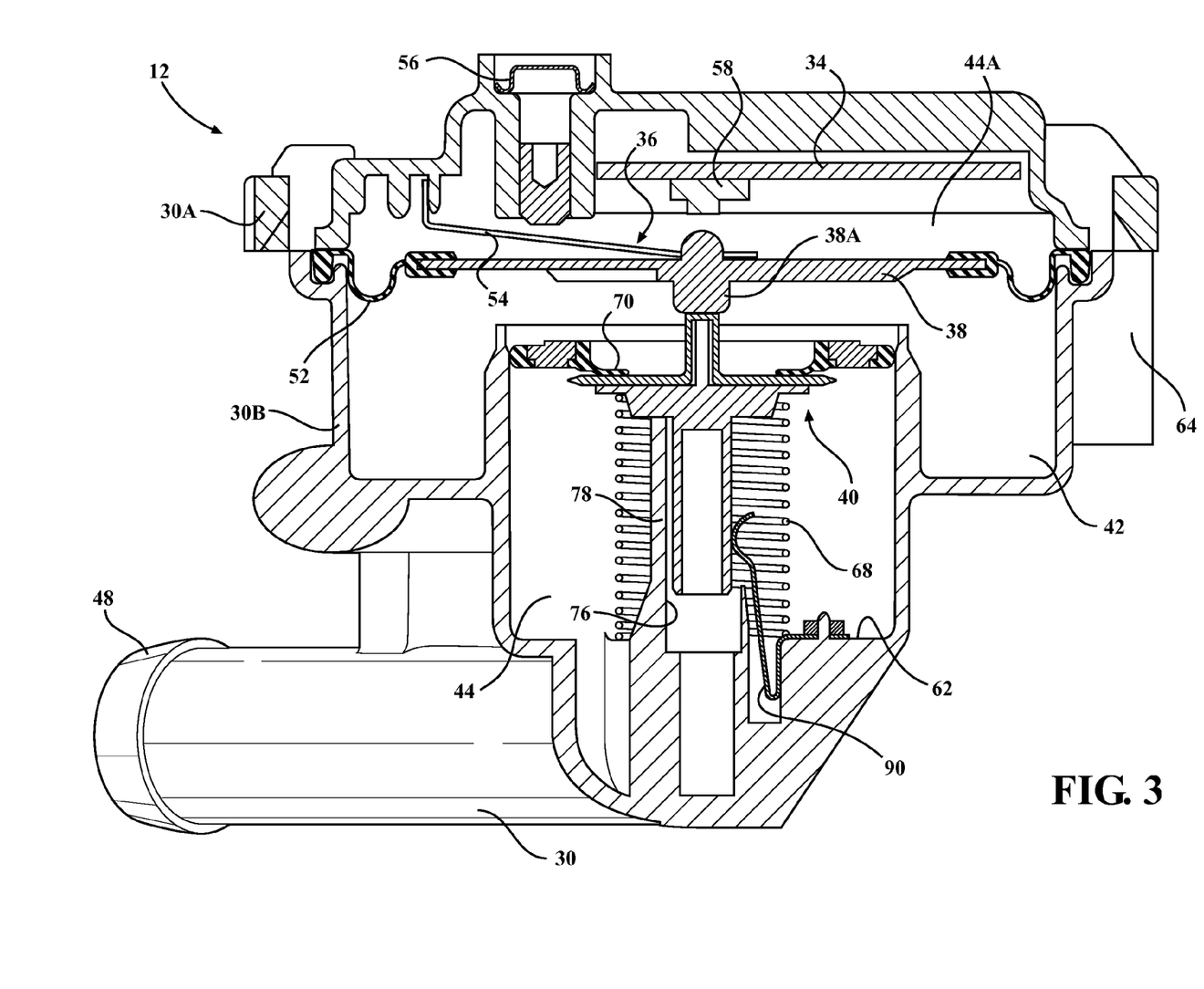
FIG. 3 is a second sectional side view of an NVLD device having an articulating poppet, according to embodiments of the present invention.

Signaling 22 occurs when vacuum at the first predetermined pressure level is present in the charcoal canister 18. A pressure operable device, shown generally at 36, separates an interior chamber in the housing 30. The pressure operable device 36 includes a diaphragm 38 that is operatively interconnected to a poppet or valve, shown generally at 40, separates the interior chamber of the housing 30 into a first portion 42 and a second portion 44. The diaphragm 38 is surrounded by a flexible outer seal 52, which allows the diaphragm 38 (which is substantially rigid) to move and keep the first portion 42 separate from the separate portion 44A. The flexible outer seal 52 is connected between an upper half 30A and a lower half 30B of the housing 30. The valve includes two main parts, a plastic poppet stem portion 40A and a metal poppet portion 40B.

The first portion 42 is in fluid communication with the ambient atmospheric pressure through a first port 46. The second portion 44 is in fluid communication with a second port 48 between housing 30 the charcoal canister 18. The second portion 44 is also in fluid communication with a separate portion 44A via signal passageway 50. Disposed in the signal passageway 50 is a cinter pill 32, which is a type of filter used for filtering air passing through the signal passageway 50.

The force created as a result of vacuum in the separate portion 44A causes the diaphragm 38 to be displaced upwardly in FIGS. 2-3. This displacement is opposed by a resilient element 54, e.g., a leaf spring. The bias of the resilient element 54 can be adjusted by a calibrating screw 56 such that a desired level of vacuum, e.g., one inch of water, depresses a switch 58 which is electrically connected to an outlet terminal 64 thought the use of a circuit board 34. As vacuum is released, i.e., the pressure in the portions 44,44A rises, the resilient element 54 pushes the diaphragm 38 away from the switch 58, whereby the switch 58 resets.

Pressure relieving 24 occurs as vacuum in the portions 44,44A increases, i.e., the pressure decreases below the calibration level for actuating the switch 58. Vacuum in the charcoal canister 18 and the second portion 44 continually acts on the valve 40 inasmuch as the first portion 42 is always at or near the ambient atmospheric pressure A. At some value of vacuum below the first predetermined level, e.g., three inches of water, this vacuum overcomes the opposing force of a second resilient element 68 and displaces the valve 40 away from a lip seal 70. The second resilient element 68 is disposed between a lower surface 60 of the plastic poppet stem portion 40A, and a bottom surface 62 of the second portion 44. This displacement opens the valve 40 from a closed position, thus allowing ambient air to be drawn through the first portion 42 into the second portion 44. Therefore, in an open position of the valve 40, the first and second ports 46,48 are in fluid communication. In this way, vacuum in the fuel system 10 can be regulated.

A portion of the second resilient element 68 also surrounds an enlarged diameter portion 66, which provides proper alignment for the resilient element 68. The poppet stem portion 40A also includes a lower stem portion 80 integrally formed with the enlarged diameter portion 66. The lower stem portion 80 is slideably disposed in a restraining tube 78, and the restraining tube 78 is integrally formed as part of the lower half 30B of the housing 30, and extends into the second portion 44. The restraining tube 78 does not completely surround the lower stem portion 80, but surrounds approximately two-hundred-seventy degrees (270°) of the lower stem portion 80. This allows for a friction spring 90 to be in sliding contact with a plurality of ribs 92 formed as part of the lower stem portion 80.

The poppet stem portion 40A also has flange portion 82 which is integrally formed with the enlarged diameter portion 66. The flange portion 82 includes the lower surface 60 and a support surface 84. Extending upwardly from the support surface 84 is a poppet pin 86, and the poppet pin 86 is slidably received into a hollowed extension 88, formed as part of the metal poppet portion 40B. Also formed as part of the metal poppet portion 40B, and surrounding the hollowed extension 88 is a poppet flange 94, which selectively contacts the lip seal 70 when the valve 40 is in the closed position. The poppet stem portion 40A and metal poppet portion 40B are not rigidly connected to each other, but rather the poppet flange 94 is supported by the flange portion 82, and is selectively in contact with the support surface 84. The non-rigid connection between the poppet pin 86 and the hollowed extension 88 allows for the metal poppet portion 40B to articulate relative to the poppet stem portion 40A, the function of which will be described later.

According to one embodiment of the present invention, the poppet stem portion 40A is formed of injection molded plastic and is normally biased toward the lip seal 70 due to the force of the second resilient element 68. To minimize resonance of the valve 40, particularly during pressure relieving 24, a damping movement effect is provided.

The damping is created via friction between an outer surface 74 of the lower stem portion 80 of the valve 40 and an inner surface 76 of the restraining tube 78 fixed to the housing 30. To control the force against the inner surface 76 of the restraining tube 78, the friction spring 90 applies a predetermined amount of force to the lower stem portion 80 of the valve. More specifically, the friction spring 90 and the inner surface 76 of the restraining tube 78 contact the ribs 92 formed as part of the lower stem portion 80. This provides a desired amount of contact area, which along with the force applied by the friction spring 90, provides the desired amount of friction. The friction force dampens the motion of the poppet stem portion 40, which has the effect of stopping resonance during the pressure relieving 24, 26.

Relieving pressure 26 is provided when there is a positive pressure in the second portion 44, e.g., when the tank 12 is being refueled. Specifically, the valve 40 is displaced to its open position to provide a very low restriction path for escaping air from the tank 12. When the charcoal canister 18, and hence the second portion 44, experience positive pressure above ambient atmospheric pressure, the signal passageway 50 communicates this positive pressure to the separate portion 44A. In turn, this positive pressure displaces the diaphragm 38 downward toward the valve 40. A diaphragm pin 38A transfers the displacement of the diaphragm 38 to the valve 40, thereby displacing the valve 40 to its open position with respect to the lip seal 70. Thus, pressure in the charcoal canister 18 due to refueling is allowed to escape through the lower portion 44, past the lip seal 70, through the first portion 42, and through the second port 46.

Relieving pressure 26 is also useful for regulating the pressure in fuel tank 20 during any situation in which the engine is turned off. By limiting the amount of positive pressure in the fuel tank 20, the cool-down vacuum effect takes place sooner.

Figure 4:
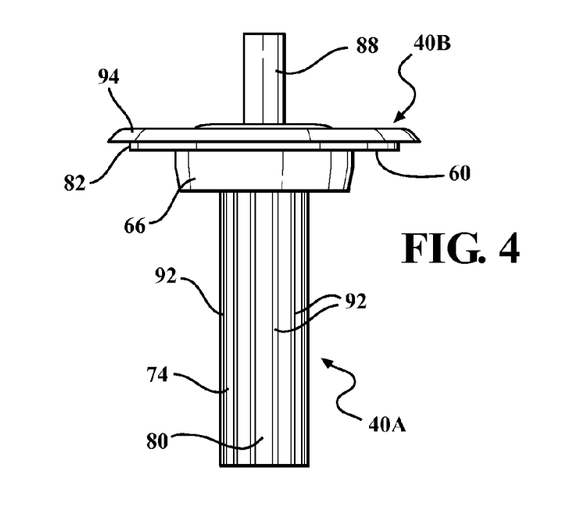
FIG. 4 is a side view of an articulating poppet, according to embodiments of the present invention.
Figure 5A:
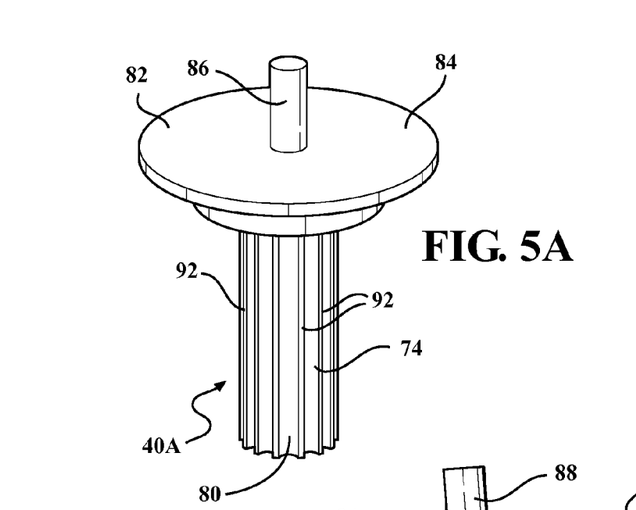
FIG. 5A is a side view of a poppet stem portion, which is part of an articulating poppet, according to embodiments of the present invention.
Figure 5B:
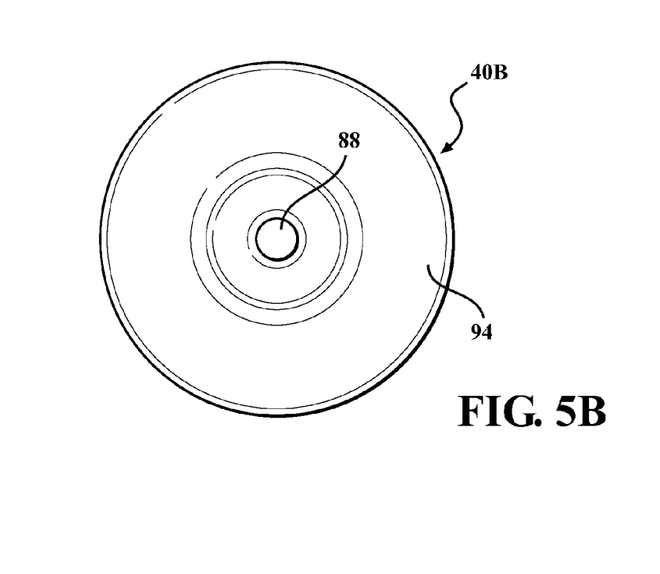
FIG. 5B is a side view of a poppet portion, which is part of an articulating poppet, according to embodiments of the present invention.
Figure 6:
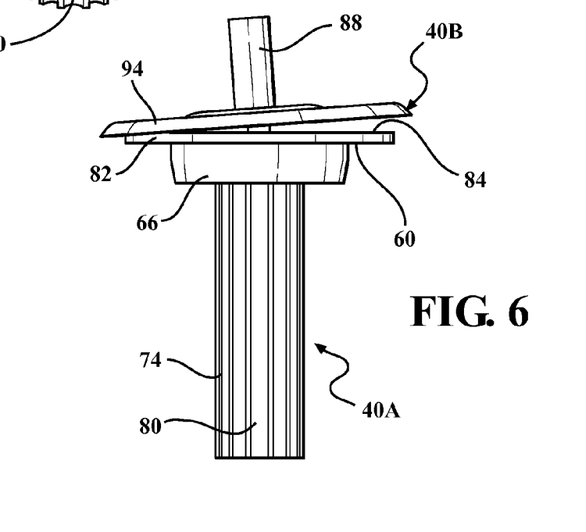
FIG. 6 is a side view of an articulating poppet, where the poppet stem portion is articulated relative to the poppet portion, according to embodiments of the present invention.

Due to various manufacturing tolerances, and variations which may occur during the manufacturing process, the restraining tube 78, and more particularly the inner surface 76 of the restraining tube 78, may not be oriented to provide proper alignment between the valve 40 and the lip seal 70. The non-rigid or articulating connection between the metal poppet portion 40B and the poppet stem portion 40A allows for the metal poppet portion 40B to provide a complete seal between the poppet flange 94 and the lip seal 70, completely closing the valve 40. This compensates for any misalignment between the valve 40 and the lip seal 70 caused by the restraining tube 78 being formed improperly. An example of the articulation between the poppet stem portion 40A and the metal poppet portion 40B is shown in FIGS. 4 and 6. The diameter of the poppet pin 86 is smaller than the inner diameter of the hollowed extension 88, which facilitates the articulation between the poppet stem portion 40A and the metal poppet portion 40B, but still allows for a full seal connection between the poppet flange 94 and the lip seal 70, as well as allowing the lower stem portion 80 to be in full sliding contact with the inner surface 76 of the restraining tube 78.

Figure 7:
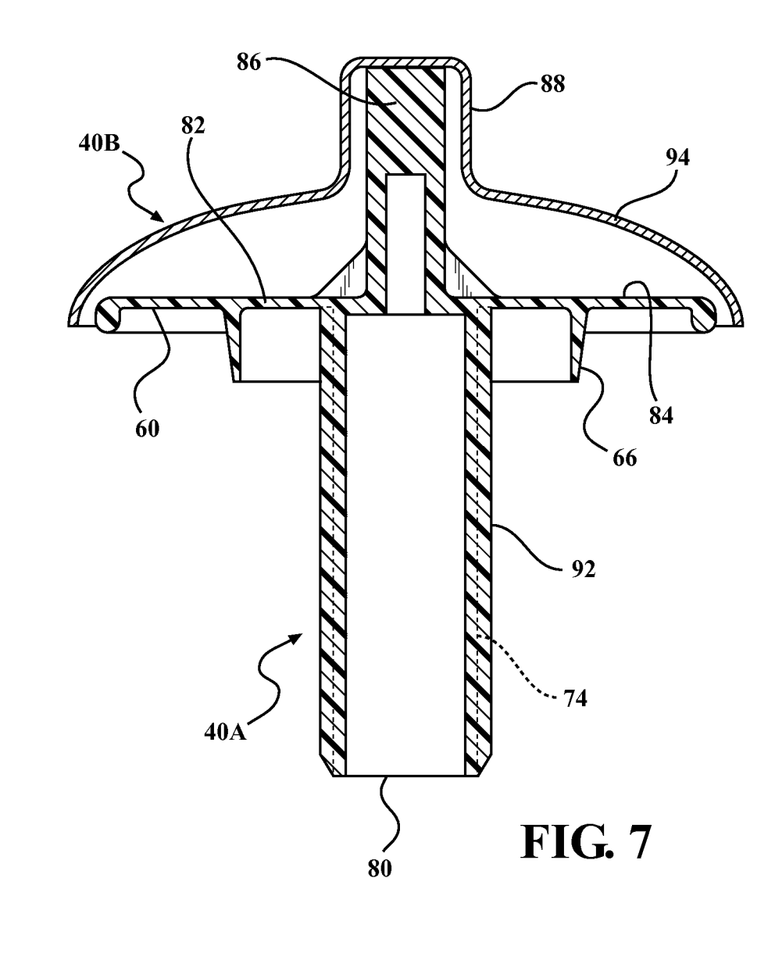
FIG. 7 is a sectional side view of an alternate embodiment of an articulating poppet, according to embodiments of the present invention.
Figure 8:
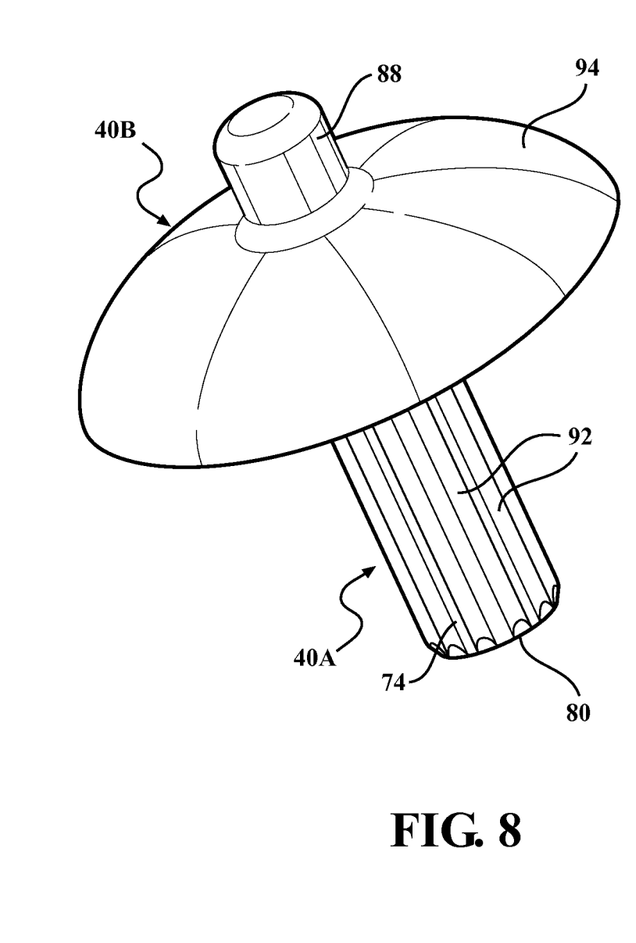
FIG. 8 is a first perspective view of an alternate embodiment of an articulating poppet, according to embodiments of the present invention.
Figure 9:
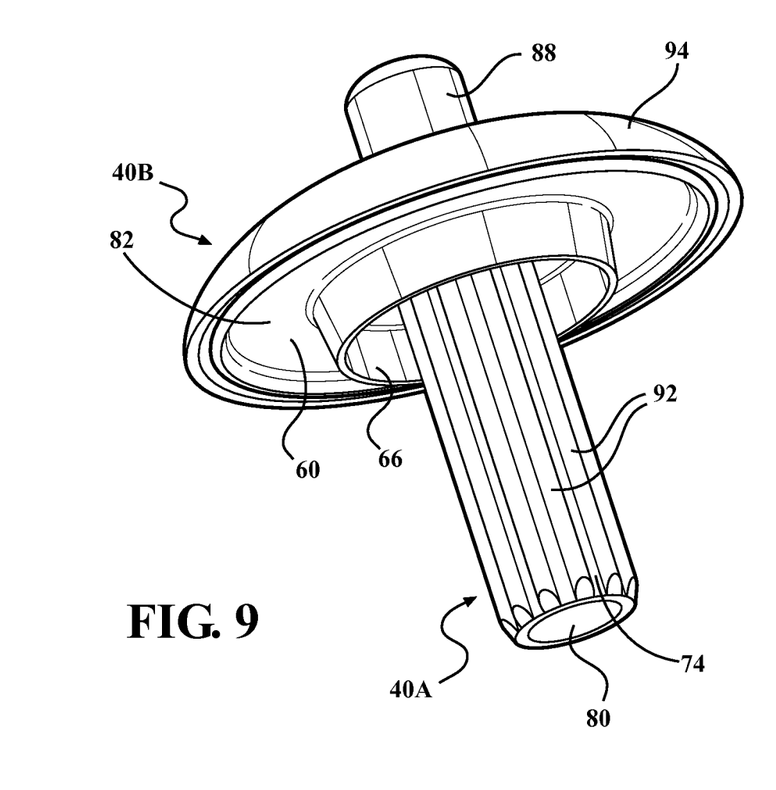
FIG. 9 is a second perspective view of an alternate embodiment of an articulating poppet, according to embodiments of the present invention.

Another embodiment of the present invention is shown in FIGS. 7-9, with like numbers referring to like elements. However, in this embodiment, the poppet flange 94 is a spherical poppet flange 94, which is selectively in contact with the lip seal 70. The spherical poppet flange 94 compensates for various changes in position of the poppet stem portion 40A and metal poppet portion 40B relative to the lip seal 70. The poppet stem portion 40A may be located at various angles, but because of the spherically shaped spherical poppet flange 94, the spherical poppet flange 94 remains in contact with the lip seal 70 such as to form a complete seal when the valve 40 is in a closed position.

Although the substantially flat poppet flange 94 and spherical poppet flange 94 have been described in the various embodiments, it is within the scope of the invention that the poppet flange 94 may be other shapes as well, and still provide an adequate sealing function with the lip seal 70.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
    an articulated valve for use with a natural vacuum leak detection (NLVD) device, the articulated valve including:
        a poppet stem portion;
        a poppet portion supported by the poppet stem portion such that the poppet portion articulates relative to the poppet stem portion, providing a sealing function when the NLVD device is in a closed position;
        a poppet flange formed as part of the poppet portion;
        a flange portion formed as part of the poppet stem portion;
        a support surface formed as part of the flange portion;
        a lower surface formed as part of the flange portion, the lower surface in contact with a resilient element for biasing the poppet valve toward a closed position;
        an enlarged diameter portion integrally formed as part of the poppet stem portion, the enlarged diameter portion being at least partially surrounded by the resilient element such that the resilient element biases the poppet stem portion and the poppet portion toward the closed position;
        a lower stem portion integrally formed with the enlarged diameter portion;
        a plurality of ribs integrally formed on the outer surface of the lower stem portion; and
        a friction spring in contact with at least one of the plurality of ribs for providing the proper amount of damping effect, as the poppet stem portion and the poppet portion move between an open position and a closed position;

wherein the poppet flange is selectively supported by the support surface of the flange portion, and allows for the poppet flange to articulate relative to the flange portion.

2. The apparatus of claim 1, further comprising:
a hollowed extension integrally formed with the poppet flange; and
a poppet pin slidably disposed within the hollowed extension, the poppet pin integrally formed with and extending away from the support surface;
wherein the outer diameter of the poppet pin is smaller than the inner diameter of the hollowed extension, allowing the poppet portion to pivot and articulate relative to the poppet stem portion, providing a sealing function when the NLVD device is in a closed position.

3. The apparatus of claim 1, the poppet flange further comprising a spherical poppet flange selectively supported by the support surface of the flange portion, wherein the spherical poppet flange provides a sealing function with a lip seal when the NLVD device is in a closed position.

4. An articulated valve, comprising:
a poppet stem portion having a flange portion, and a poppet pin integrally formed with and extending away from the flange portion;
a poppet portion having a hollowed extension and a poppet flange integrally formed together, the poppet flange selectively in contact with and supported by the flange portion;
a lower surface formed as part of the flange portion;
a support surface formed as part of the flange portion on the opposite side of the flange portion as the lower surface;
an enlarged diameter portion integrally formed as part of the poppet stem portion such that the enlarged diameter portion is connected to the lower surface;
a lower stem portion integrally formed with the enlarged diameter portion;
a plurality of ribs integrally formed on the outer surface of the lower stem portion; and
a friction spring in contact with at least one of the plurality of ribs for providing the proper amount of damping effect, as the poppet stem portion and the poppet portion move between an open position and a closed position;
wherein the support surface is selectively in contact with and supports the poppet flange, while allowing the poppet flange to articulate relative to the flange portion, and the poppet pin is slidably received into the hollowed extension, allowing the poppet stem portion to articulate relative to the poppet portion.

5. The articulated valve of claim 4, further comprising a resilient element at least partially surrounding the enlarged diameter portion, the resilient element biasing the poppet stem portion and the poppet portion toward the closed position.

6. The articulated valve of claim 4, the poppet flange further comprising a spherical poppet flange selectively supported by the support surface of the flange portion, wherein the spherical poppet flange providing a sealing function with a lip seal when the articulated valve is in a closed position.

7. An articulated valve for preventing leaks in a natural vacuum leak detection (NLVD) device, comprising:
a poppet stem portion;
a flange portion having a lower surface and a support surface, the flange portion being part of the poppet stem portion;
an enlarged diameter portion integrally formed with the poppet stem portion;
a lower stem portion integrally formed with the enlarged diameter portion;
a plurality of ribs integrally formed on the outer surface of the lower stem portion;
a poppet pin integrally formed with and extending away from the flange portion;
a poppet portion;
a poppet flange selectively in contact with and supported by the flange portion, the poppet flange being part of the poppet portion;
a hollowed extension integrally formed with the poppet flange; and
a friction spring in contact with at least one of the plurality of ribs for providing the proper amount of damping effect, as the poppet stem portion and the poppet portion move between an open position and a closed position;
wherein the poppet pin is slidably received into the hollowed extension, allowing the poppet stem portion to articulate relative to the poppet portion.

8. The articulated valve for preventing leaks in a natural vacuum leak device of claim 7, further comprising a resilient element at least partially surrounding the enlarged diameter portion, the resilient element biasing the poppet stem portion and the poppet portion toward a closed position.

9. The articulated valve for preventing leaks in a natural vacuum leak device of claim 7, wherein the poppet flange is spherically shaped.

10. The articulated valve for preventing leaks in a natural vacuum leak device of claim 7, wherein the poppet portion is a metal poppet portion.

11. The articulated valve for preventing leaks in a natural vacuum leak device of claim 7, wherein the poppet stem portion is a plastic poppet stem portion.

* * * * *